Patented Feb. 20, 1940

2,190,913

UNITED STATES PATENT OFFICE 2,190,913

PROCESS FOR PRODUCING ALUMINUM CHLORIDE

Paul Kühnel, Oberhausen-Holten, Germany, assignor to Ruhrchemie Aktiengesellschaft, Oberhausen-Holten, Germany, a corporation of Germany No Drawing. Application June 16, 1937, Serial No. 148,585. In Germany June 22, 1936

2 Claims. (Cl. 23—93)

It is known to convert aluminum (for example, in the form of turnings) into aluminum chloride with hydrochloric acid gas. This reaction can however be carried out only at high temperatures. In order to obtain practicable reaction speeds, it is necessary to employ temperatures of from 500 to 600° C., and only 65 to 75% of the aluminum is converted into aluminum chloride, the remainder of the aluminum forming a composition which resembles slag and does not react.

It has already been proposed to suspend the aluminum in molten zinc chloride and to convert the aluminum into aluminum chloride by introducing hydrochloric acid gas. The reaction certainly commences at low temperatures, but in this way many difficulties arise.

It has been found that it is not by any means necessary to employ an excess of zinc chloride, in fact very small quantities of zinc chloride suffice for rendering metallic aluminum easily attacked by hydrochloric acid, that is to say, it suffices to add zinc chloride in the amount necessary to induce the required reaction. Thus, for example, by the addition of only 1% of zinc chloride at between 300 and 500° C. a violent reaction is set up, and the aluminum is converted to the extent of over 90% into aluminum chloride in a simple reaction. It is not necessary to mix the zinc chloride with the aluminum; it is for example sufficient to conduct the hydrochloric acid gas over zinc chloride at elevated temperature before it reaches the aluminum, the gas in its passage over the zinc chloride taking up small quantities of zinc chloride which are sufficient for accelerating the conversion of the aluminum.

I claim:

1. A process for producing sublimated aluminum chloride, consisting in subjecting metallic aluminum to the action of hydrochloric acid gas at high temperatures varying between substantially 300° and 500° C. and in the presence of preformed zinc chloride that is introduced into the reaction zone in a quantity that is small in relation to the quantity of aluminum but sufficient to induce the required reaction between the hydrochloric acid gas and the aluminum at the temperatures indicated.

2. A process for producing sublimated aluminum chloride, consisting in subjecting metallic aluminum to the action of hydrochloric acid gas at high temperatures varying between substantially 300° and 500° C. and in the presence of zinc chloride that is introduced in the quantity necessary to induce the required reaction between the hydrochloric acid gas and the aluminum at the temperatures indicated, the zinc chloride being introduced in hydrochloric acid gas which is caused to react upon the aluminum.

PAUL KÜHNEL.